(No Model.)

A. HAARLANDER & O. F. GRANT.
HANDLE FOR CULINARY VESSELS.

No. 430,941. Patented June 24, 1890.

A. Haarlander
O. F. Grant
Inventors
by Connolly Bros
Attys

Witnesses:
J. B. McGirr
N. C. Evert

UNITED STATES PATENT OFFICE.

AUGUST HAARLANDER AND OSCAR F. GRANT, OF ALLEGHENY, PENNSYLVANIA, ASSIGNORS TO THE STANDARD MANUFACTURING COMPANY, OF SAME PLACE.

HANDLE FOR CULINARY VESSELS.

SPECIFICATION forming part of Letters Patent No. 430,941, dated June 24, 1890.

Application filed February 4, 1890. Serial No. 339,121. (No model.)

*To all whom it may concern:*

Be it known that we, AUGUST HAARLANDER and OSCAR F. GRANT, citizens of the United States, residing at Allegheny, in the county of Allegheny and State of Pennsylvania, have invented certain new and useful Improvements in Handles for Culinary Vessels; and we do hereby declare the following to be a full, clear, and exact description of the invention, reference being had to the accompanying drawings, which form part of this specification.

This invention has relation to handles for hollow cast-iron enameled culinary vessels, such as sauce and stew pans; and it consists of a handle made from a sheet of tinned iron, folded over to form a flattened or oval tube tapering toward its outer end, and having a wire loop or staple wedged and soldered in the outer end.

The improvement is intended to take the place of the handle shown and described in Letters Patent of the United States No. 397,098, being deemed more economical to make and apply, more convenient to handle, more durable, and less liable to become heated than the device shown in said patent.

Figure 1:
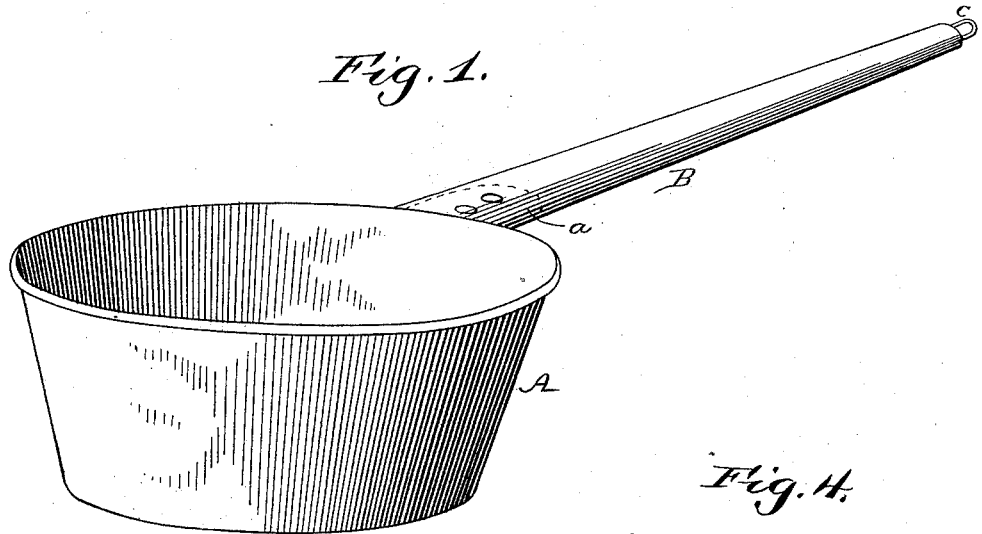
Figure 4:
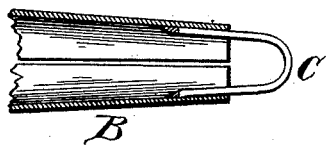
Figure 2:
Figure 3:
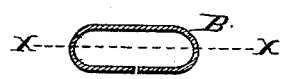

In the accompanying drawings, Figure 1 is a perspective view showing the handle applied to a sauce-pan. Fig. 2 is a longitudinal sectional view of the handle. Fig. 3 is a transverse sectional view, and Fig. 4 is a sectional view of a portion of the handle.

The vessel A is cast with a lug or ear $a$ on one side, rising at a slight angle and of oval shape in cross-section. The undercut bevel shown at $a$ in Patent No. 397,098 is not required.

The handle B is made from a tapering strip of metal folded laterally, so as to bring its edges together, or nearly so, on the under side, and the tube flattened to the oval shape shown. The wire loop or staple $c$ is then inserted through the larger end of the tube and projected through the smaller end, wherein it becomes wedged, and is then fastened by dipping into a bath of tin or solder, which sweats the parts together.

The handle is fitted to the ear of the vessel, which is pierced for rivets, the larger end embracing the ear and being also pierced. The two are then securely riveted together.

This handle has a firm purchase on both sides and edges of the ear instead of merely resting on the upper surface, and is therefore more firm and rigid than the cast-metal handle employed usually. The metal of the handle, being thin, is light, but is rendered strong by being folded or made tubular. Its smooth surface, not obtainable in cast-iron handles, is an advantageous feature in grasping and holding, while by reason of the thinness of the metal and the tubular form of the handle it does not readily heat.

The staple or loop in the end of the handle is for hanging on the wall.

Having described our invention, what we claim as new, and desire to secure by Letters Patent, is—

The handle for cast-iron enameled culinary vessels, consisting of a flattened or oval tapering tube having a wire loop or staple soldered and wedged in its smaller end, the sides of the handle converging toward the outer end, substantially as described.

In testimony that we claim the foregoing we have hereunto set our hands this 20th day of January, 1890.

AUGUST HAARLANDER.
OSCAR F. GRANT.

Witnesses:
FRANCIS J. TORRANCE,
CHAS. F. ARROTT.